No. 842,510. PATENTED JAN. 29, 1907.
F. H. ARNOLD.
SAFETY RAZOR.
APPLICATION FILED SEPT. 15, 1906.

Fred. H. Arnold, Inventor

Witnesses
Chas. F. Davies.
J. O'R. Kelly.

By  Attorney

UNITED STATES PATENT OFFICE.

FREDERICK H. ARNOLD, OF READING, PENNSYLVANIA.

SAFETY-RAZOR.

No. 842,510.

Specification of Letters Patent.

Patented Jan. 29, 1907.

Application filed September 15, 1906. Serial No. 334,788.

*To all whom it may concern:*

Be it known that I, FREDERICK H. ARNOLD, a citizen of the United States, residing at Reading, in the county of Berks and State of Pennsylvania, have invented certain new and useful Improvements in Safety-Razors, of which the following is a specification.

This invention relates to improvements in safety-razors of the class in which the blade is arranged to lie on the same plane and in line with the handle.

The object of the invention is to provide a razor of simple construction with a minimum number of parts and capable of being used with either hand, provision being made for cutting from both sides of the guard-plate.

The invention consists of a handle and a guard and blade, each of which latter two are provided with a tapered shank adapted to be engaged and held in the handle by friction, the principal object of the invention being its simplicity and the ease with which it can be assembled.

The invention is more fully described in the following specifications and clearly illustrated in the accompanying drawings, in which—

Figure 1:
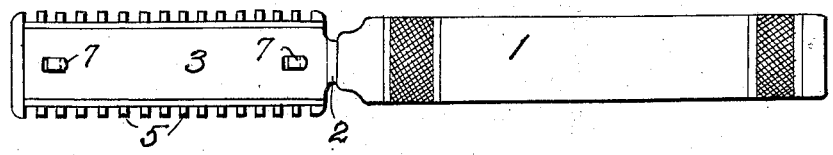
Figure 2:
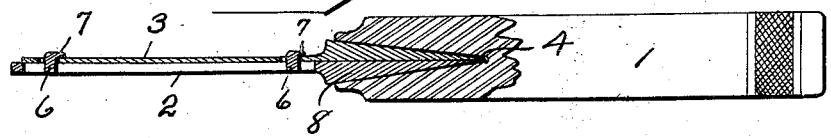
Figure 3:
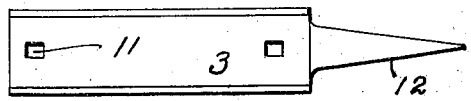
Figure 4:
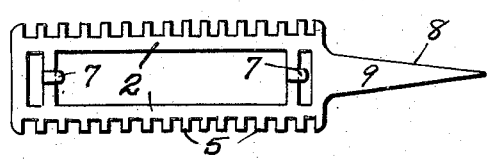
Figure 4:

Figure 1 is a plan view, and Fig. 2 a sectional view, of my razor. Fig. 3 is a detail view of the blade, and Fig. 4 is a detail view of the guard.

The entire device consists of a handle 1, a guard 2, and a blade 3.

The handle is formed with a tapered central opening 4 at its inner end.

The guard is formed with the usual teeth 5 and also with an upwardly-projecting hook 6 near either end, the extremities 7 of these hooks extending in the same direction and toward the handle end of the guard. The guard is also formed with a tapered half-round shank 8, one of whose faces 9 is flat and flush with the surface of the guard.

The numeral 3 indicates the blade, which is formed with a rectangular perforation 11 near either end and a tapered shank 12 at one end. This shank, like the shank 8, is half-round, and one of its faces is flat and flush with the blade-surface, and they are so arranged that when the two shanks are placed together they form a substantially conical or tapered stem.

To assemble the parts, the blade is placed against the guard, the hooks 6 entering the perforations 11. The blade is then pushed tightly under the hooked ends 7, thus bringing the flat faces of the shanks 8 and 12 together and forming a stem with a taper slightly different from the taper of the opening 4 in the handle. The handle is then forced onto the stem, and the taper is such that a reasonable pressure will securely hold the parts in position.

Having thus fully described my invention, what I claim, and desire to secure by Letters Patent, is—

In a safety-razor a handle having a tapered central opening in one end and a guard having an angled projection near either end and a tapered shank one of whose faces is flush with the surface of the guard, in combination with a blade having a corresponding shank and a rectangular perforation near either end adapted to engage said projections, said shanks being held together by pressing said handle thereon.

In testimony whereof I have signed my name to this specification in the presence of two subscribing witnesses.

FREDERICK H. ARNOLD.

Witnesses:
M. C. KREIDER,
ED. A. KELLY.